(12) United States Patent
Narasimhan et al.

(10) Patent No.: US 10,999,406 B2
(45) Date of Patent: *May 4, 2021

(54) ATTACHING SERVICE LEVEL AGREEMENTS TO APPLICATION CONTAINERS AND ENABLING SERVICE ASSURANCE

(71) Applicant: Cisco Technology, Inc., San Jose, CA (US)

(72) Inventors: Srikanth Narasimhan, Bangalore (IN); Chao Feng, San Jose, CA (US); Ajit Sanzgiri, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,380

(22) Filed: Feb. 5, 2019

(65) Prior Publication Data
US 2019/0173978 A1 Jun. 6, 2019

Related U.S. Application Data

(63) Continuation of application No. 14/994,074, filed on Jan. 12, 2016, now Pat. No. 10,367,914.

(51) Int. Cl.
*H04L 29/08* (2006.01)
*H04L 29/06* (2006.01)
(Continued)

(52) U.S. Cl.
CPC ........ *H04L 67/327* (2013.01); *H04L 12/4625* (2013.01); *H04L 12/4641* (2013.01);
(Continued)

(58) Field of Classification Search
CPC ............ H04L 12/4641; H04L 41/0843; H04L 41/5048; H04L 47/56; H04L 47/6275;
(Continued)

(56) References Cited

U.S. PATENT DOCUMENTS 5,812,773 A 9/1998 Norin
5,889,896 A 3/1999 Meshinsky et al.
(Continued)

FOREIGN PATENT DOCUMENTS

CN 101719930 6/2010
CN 101394360 7/2011
(Continued)

OTHER PUBLICATIONS

Amedro, Brian, et al., "An Efficient Framework for Running Applications on Clusters, Grids and Cloud," 2010, 17 pages.
(Continued)

*Primary Examiner* — Mohamed A. Wasel
(74) *Attorney, Agent, or Firm* — Polsinelli PC

(57) ABSTRACT

Providing a template for orchestration of a cloud provided service in a datacenter. This template can include virtual processing services, virtual networking services, storage services, and service level requirements that a user or administrator can select for the cloud provided service. Based on the template the cloud provided service can be provisioned according to the requirements of the service level agreement.

17 Claims, 7 Drawing Sheets

(51) Int. Cl.
   *H04L 12/46*     (2006.01)
   *H04L 12/861*    (2013.01)
   *H04L 12/24*     (2006.01)
   *H04L 12/875*    (2013.01)
   *H04L 12/863*    (2013.01)
   *H04L 12/865*    (2013.01)

(52) U.S. Cl.
   CPC ...... *H04L 41/0843* (2013.01); *H04L 41/0886* (2013.01); *H04L 41/5048* (2013.01); *H04L 47/56* (2013.01); *H04L 47/624* (2013.01); *H04L 47/6275* (2013.01); *H04L 49/90* (2013.01); *H04L 67/10* (2013.01); *H04L 67/1002* (2013.01); *H04L 67/1044* (2013.01); *H04L 67/1097* (2013.01); *H04L 67/322* (2013.01); *H04L 67/42* (2013.01); *H04L 69/03* (2013.01)

(58) Field of Classification Search
   CPC ..... H04L 49/90; H04L 67/10; H04L 67/1044; H04L 67/322; H04L 67/327
   See application file for complete search history.

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,842,783 B1 * | 1/2005 | Boivie | H04L 41/0896 370/235 |
| 6,996,615 B1 | 2/2006 | McGuire | |
| 7,054,930 B1 | 5/2006 | Cheriton | |
| 7,058,706 B1 | 6/2006 | Iyer et al. | |
| 7,062,571 B1 | 6/2006 | Dale et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,583,665 B1 | 9/2009 | Duncan et al. | |
| 7,606,147 B2 | 10/2009 | Luft et al. | |
| 7,644,437 B2 | 1/2010 | Volpano | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,296,419 B1 * | 10/2012 | Khanna | G06F 9/5083 709/224 |
| 8,301,746 B2 | 10/2012 | Head et al. | |
| 8,321,558 B1 * | 11/2012 | Sirota | G06F 9/5011 709/224 |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,495,725 B2 | 7/2013 | Ahn | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andries et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,415 B1 * | 5/2014 | Sirota | G06F 9/5011 709/226 |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,002 B1 | 9/2014 | Dickinson et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,130,846 B1 | 9/2015 | Szabo et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,294,408 B1 | 3/2016 | Dickinson et al. | |
| 9,313,048 B2 | 4/2016 | Chang et al. | |
| 9,361,192 B2 | 6/2016 | Smith et al. | |
| 9,379,982 B1 | 6/2016 | Krishna et al. | |
| 9,380,075 B2 | 6/2016 | He et al. | |
| 9,432,245 B1 | 8/2016 | Sorenson, III et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,571,570 B1 | 2/2017 | Mutnuru | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 10,171,380 B2 * | 1/2019 | Apte | H04L 67/10 |
| 2001/0055303 A1 | 12/2001 | Horton et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |

(56) References Cited

U.S. PATENT DOCUMENTS

| | | |
|---|---|---|
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0008021 A1* | 1/2005 | Bullis .......... H04L 47/568 370/395.4 |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0002731 A1* | 1/2008 | Tripathi .......... H04L 49/901 370/412 |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0262695 A1 | 10/2010 | Mays et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |

(56) References Cited

U.S. PATENT DOCUMENTS

| | | |
|---|---|---|
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0219405 A1* | 8/2013 | Lee ..................... G06F 9/5038 718/105 |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075032 A1* | 3/2014 | Vasudevan .......... H04L 41/5048 709/226 |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0130055 A1 | 5/2014 | Guha |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0337435 A1* | 11/2014 | Kaefer ................. G06F 9/5083 709/204 |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0067171 A1 | 3/2015 | Yum et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0180736 A1* | 6/2015 | Leung ................. H04L 41/5054 709/226 |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326215 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |

(56) References Cited

U.S. PATENT DOCUMENTS

| | | | |
|---|---|---|---|
| 2017/0099188 | A1 | 4/2017 | Chang et al. |
| 2017/0104755 | A1 | 4/2017 | Arregoces et al. |
| 2017/0147297 | A1 | 5/2017 | Krishnamurthy et al. |
| 2017/0149878 | A1 | 5/2017 | Mutnuru |
| 2017/0163531 | A1 | 6/2017 | Kumar et al. |
| 2017/0171158 | A1 | 6/2017 | Hoy et al. |
| 2017/0264663 | A1 | 9/2017 | Bicket et al. |
| 2017/0324813 | A1 | 11/2017 | Jain et al. |
| 2017/0339070 | A1 | 11/2017 | Chang et al. |
| 2019/0196878 | A1* | 6/2019 | Li .................. G06F 9/45558 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface-Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.

Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.

(56) References Cited

OTHER PUBLICATIONS

Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.
Manoel, Edson et al., "Introducing IBM Tivoli Service Level Advisor," Tivoli Software IBM, ibm.com/redbooks, Jul. 2002.
CISCO Systems, Inc., "Virtualized Multiservice Data Center (VMDC) 3.0.1 Design Guide," May 8, 2013.
IBM Corp., "Activity: A735—Monitor, Analyze and Report Availability," http://www.visioline.ee/itup/itup/capabilitypatterns/monitor_analyze_report_avail_874754D2.html_wbs.html?proc=_mDgfgUAFEdqBaNyzr0kN-Q&path=_mDgfgUAFEdqBaNyzr0kN-Q,_FXBxwHyLEdqlDu7MZhXNRw; 2005, 2008.

\* cited by examiner

| Customer | Product | Availability | Provisioning Time | Price/Month | Outage Refund |
|---|---|---|---|---|---|
| Web Inc. | Web Site | 99% | 5 days | $100 | 5% per extra day unavailable |
| Hospital LLC. | Patient Records | 99.99% | 12 hours | $300 | 15% per extra day unavailable |
| Hospital LLC. | Web Site | 99.9% | 1 day | $100 | 10% per extra day unavailable |
| Hospital LLC. | Employee Management | 99% | 5 days | $150 | 5% per extra day unavailable |
| INTERNAL | Billing | 99.9% | 20 hours | N/A | N/A |
| INTERNAL | Analytics | 99.999% | 30 minutes | N/A | N/A |

FIG. 2

| SLA Provisioning Time | Container Provisioning Priority |
|---|---|
| 10-30 minutes | 1 |
| 30-60 minutes | 2 |
| 1-6 hours | 3 |
| 6-24 hours | 4 |
| 1-5 days | 5 |
| >5 days | 6 |

FIG. 3

ATTACHING SERVICE LEVEL AGREEMENTS TO APPLICATION CONTAINERS AND ENABLING SERVICE ASSURANCE

CROSS-REFERENCE TO RELATED APPLICATIONS

This application is a Continuation of U.S. application Ser. No. 14/994,074, filed on Jan. 12, 2016, the content of which is incorporated herein by reference in its entirety.

TECHNICAL FIELD

The present technology pertains to service level agreements and more specifically pertains to service level agreements within the context of software for orchestrating application containers for cloud services.

BACKGROUND

Software for orchestrating application containers for cloud services can automate the coordinated installation and licensing of multiple virtual services. This software can enable quick set up of virtualized applications by providing a network container abstraction that is easy to customize and consume for server and application administrators. This software allows users to define container templates as well as to instantiate (e.g., provision) container instances. Instantiating a container involves automated set up and provisioning of virtual services.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2 shows an example service level agreement (SLA) table according to various embodiments;

FIG. 3 shows an example translation table for mapping an SLA provisioning time to a container provisioning priority;

DESCRIPTION OF EXAMPLE EMBODIMENTS

Overview

Figure 1:
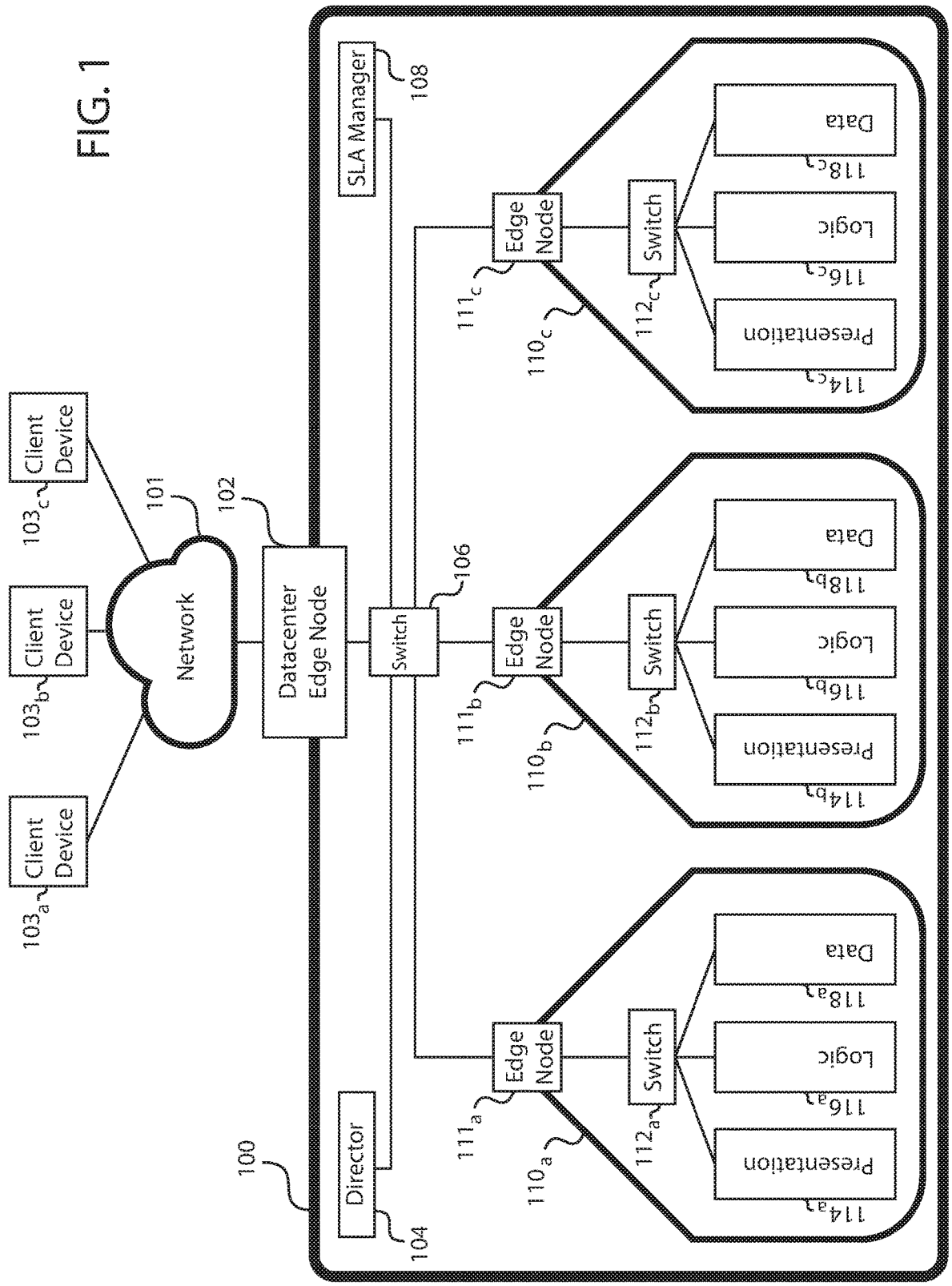
FIG. 1 illustrates an example datacenter configuration with multiple containers in accordance with various embodiments.

An example method includes providing a template for orchestration of a cloud provided service in a datacenter. This template can include virtual processing services, virtual networking services, storage services, and service level requirements that a user or administrator can select for the cloud provided service. The example method can continue by automatically provisioning the cloud provided service according to the service level agreement. The provisioning can include provisioning virtual processing services, virtual networking services, storage services, and service level requirements that the user has selected. The example method can include provisioning the cloud provided service according to a provisioning queue. Queue placement can be according to the service level requirement, available computing resources, other tasks in the queue that require the computing resources, and a priority level associated with the tasks in the existing queue. Access to this cloud provided service can be restricted using a virtual firewall.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a service assurance system for application containers.

The increasing use of virtualized private clouds to deliver infrastructure-as-a-service (IaaS) is helping IT organizations deliver applications and IT services to their customers more efficiently and with greater agility. However, virtualization is also leading to unsecure virtual machine (VM) sprawl, adversely affecting security compliance and regulatory requirements. It can be time consuming to configure network connectivity for application services with the proper security policies, while allowing for workload mobility and policy consistency. Furthermore, virtual networking services can be cost prohibitive for production deployments. Software for orchestrating application containers can help with the efficient deployment of virtualized applications by automating the provisioning of virtual private data centers (e.g. application containers). This software can deliver secure virtualized isolation and segmentation independent of the physical topology in minutes, can boost overall productivity in the IT organization, and can help lower operating costs. An example of such software is Virtual Application Cloud Segmentation (VACS) offered by CISCO SYSTEMS Inc.

Software for orchestrating application containers can be a complete solution with preconfigured and integrated virtual networking, virtual security and L4-L7 services, workflow automation, and configuration tools. Provisioning of virtual networking and network services, such as security and load balancing, can be done automatically and consistently across hypervisor environments. Software for orchestrating application containers can automate the installation, licensing, and provisioning of all included components using an integrated GUI.

Software for orchestrating application containers can provide secure segmentation and rapid deployment of applications in virtual data centers by consolidating physical resources on shared infrastructure and providing virtual security services that can help ensure consistency and regulatory compliance. Software for orchestrating application containers can provide simplified virtual networking and security through a wizard-based provisioning model. For example, major parameters for an application container can be selected using a wizard; major parameters can include application container building blocks and the configuration thereof as well as configurations for individual components of an application container. In some embodiments, an administrator can select or submit configuration information (e.g., access credentials, project names, security codes, software registration keys) which can then be utilized to configure multiple components of an application container; this can help an administrator or customer to create or provision an application container template without entering information multiple times for each component.

FIG. 1 illustrates an example datacenter configuration with multiple application containers $110_a$, $110_b$, and $110_c$ (collectively, "application container 110") in accordance with various embodiments. An application container 110 can be a logically segmented section of datacenter and can be configured to provide a specific service. Network 101 (e.g., the internet) can interconnect client devices $103_a$, $103_b$, and $103_c$ (collectively, "client device 103"), as well as datacenter 100 via datacenter edge node 102.

Traditionally, the majority of datacenter 100 traffic passed "north-south," travelling between client devices 103 and datacenter 100 through network 101. Because of the north-south focus of traditional datacenters 100, security and management is traditionally focused on datacenter edge node 102 which can include a router and firewall for filtering and managing traffic to and from network 101. Intra-datacenter traffic is typically called "east-west" traffic and refers to traffic between nodes on within datacenter 100.

Application containers 110 can be logically segmented sections of datacenter 100 and provide increased security and management for east-west traffic. In some embodiments, an application container 110 can include a collection of virtual components such as machines (e.g., VMs), storage, firewalls (e.g., virtual firewalls), switches (e.g., virtual switches), etc. In some embodiments, edge nodes $111_a$, $111_b$, and $111_c$ (collectively, "edge node 111") can include a virtual router and a virtual firewall. In some embodiments, application container 110 traffic is isolated within the application container 110 unless passing through edge node 111.

Application containers 110 can contain switches $112_a$, $112_b$, and $112_c$ (collectively, "switch 112") and a "three-tiered" structure. An example three-tiered structure can contain organizational layers such as presentation $114_a$, $114_b$, and $114_c$ (collectively, "presentation 114"); logic $116_a$, $116_b$, and $116_c$ (collectively, "logic 116"); and data $118_a$, $118_b$, and $118_c$ (collectively, "data 118"). In some embodiments, presentation 114, logic 116, and data 118 are communicatively segmented; alternatively, components within presentation 114, logic 116, and data 118 can freely intercommunicate.

Presentation 114 can serve data to client devices 103, logic 116 can process data for serving, and data 118 can store data for processing. For example, if an application container $110_a$ represents a web server, presentation $114_a$ can receive webpage requests from client device 103 and serve static or cached content to client device 103. If presentation 114 requires dynamic content, it can use logic 116 for generation of such dynamic content. Logic 116 can process and generate content, for example, using an application server such as Ruby on Rails, Java EE, ASP.NET, PHP, etc. Data 118 can be virtual and can be a back-end database or data store that can be accessed by logic 116 and/or presentation 114. In some embodiments, traffic from outside an application container 110 cannot directly access to data 118.

It should be understood that a three-tiered structure is only one possible organization of components included in an application container 110. Alternate architectures such as an n-tier architecture (e.g., a four-tier architecture including a business logic layer to manage costs etc.) or an ad-hoc architecture (where there is not distinct segmentation of server responsibilities) are also possible in accordance with the principles disclosed herein.

Application containers 110 that perform similar functions can often share various characteristics; for example, application containers 110 for serving websites likely will have similar structures and components. Application container templates can be created to assist provisioning and managing application containers 110. For example, if an administrator wishes to provision a customer management application container 110 within datacenter 100, the administrator can select an appropriate customer management application container template and provision all of the components at once. An application container template can specify the virtual machines and components within the application container 110 including how the components are interconnected. The application container template can also include pre-configuration installations of software (including operating systems and applications) so that when a new application container 110 is provisioned based on the application container template, the requestor can simply supply a limited set of configuration information unique to the individual application container 110. All other configuration information can be pre-loaded as part of the application container template. This provisioning can include spinning up (e.g., loading, initializing, and provisioning) and configuring virtual routers, firewalls, switches, machines, load balancers, etc. as well as configuring communication between such components.

Director 104 can control the provisioning, monitoring, and maintenance of application containers 110 and other components within datacenter 100. For example, director 104 can provision a new application container 110 based on an application container template, close an application container 110, diagnose an application container 110, etc. Director 104 can run software for orchestrating application containers for cloud services. Director 104 can administer the licenses for components in application container 110. For example, a virtual machine or application within application container 110 may require a paid license; director 104 can determine the required licensing payments. In some embodiments, director 104 facilitates data auditing by determining access privileges relevant to the various components in datacenter 100 and an application container 110. In some embodiments, director 104 can provision two application containers 110 in physically distinct locations for redundancy and reliability.

In some embodiments, application containers 110 can be associated with distinct customers and different uses. For example, application container $110_a$ can serve a web site associated with Customer A while $110_b$ can serve a web site associated with Customer B and container $110_c$ can serve a payments platform associated with Customer C.

A service level agreement (SLA) can serve as an agreement between a provider associated with datacenter 100 and a customer associated with one or more application containers 110. SLA manager 108 can store SLAs and monitor their fulfillment. In some embodiments, SLA manager 108 is located outside of datacenter 100 and is accessible via network 101. In some embodiments, SLA manager 108 can organize SLAs for review by a customer or administrator. SLA manager 108 can create and assign SLAs based on various rules and policies. For example, a general customer SLA can be associated with a certain customer and SLA manager 108 can assign that customer SLA to the containers 110 that the customer requests.

An SLA can be associated with a customer, a business unit, a type of application, etc. In some embodiments, the SLA can be assigned to an application container 110 based on the application container's associated user group, owner (e.g., customer), business unit, type of application, etc. For example, one user group (e.g., a "testing" user group) can be associated with a lower SLA service category (e.g., "bronze") and each container that is provisioned from the user group can be associated with the lower SLA service category.

FIG. 2 shows an example SLA table with various example service level agreements according to various embodiments. For example, "Web Inc." has an SLA for a "web site" describing various service level requirements such as 99% availability, a maximum provisioning time of 5 days, and at a price of $100/month. If the service is not available at least 99% of the month, Web Inc. can be refunded 5% of their monthly rate per extra day that their service is unavailable. The percentage availability can be referenced by how many "nines" are in the amount; for example, 99% is "two nines", 99.9% is "three nines", 99.999% is "five nines" of availability. Availability can refer to the amount of time that network 101 can access the relevant service (e.g., application container 110) or the amount of time that application container 110 is "up" irrespective of whether there is a connectivity issue between network 101 and application container 110. Provisioning time can refer to the amount of time it takes to provision a service for a customer. For example, it may take minutes, hours, or days to set up application container 110 by spinning up virtual machines, installing and configuring operating systems and applications, and transferring data. In some embodiments, an SLA includes other service level requirements such as a service tier (e.g., "gold," "silver," or "bronze") and each service tier is associated with availability, prices, outage refund, and service options (e.g., technical support). An SLA can have more or fewer service level requirements; for example, an SLA can specify bandwidth allotments, processor and ram allocations, geographical constraints, maintenance periods, etc.

In some embodiments, SLAs are used internally; for example, for customer "INTERNAL" (e.g., the provider company also being a customer of their own services) has an SLA for Analytics requiring five nines (99.999%) of availability. This can be useful for a large organization that has a large private cloud that provides various services of varying importance, even if the provider does not sell use of their private cloud. Having an internal SLA can inform datacenter administrators, director 104, and other elements in datacenter 100 of the relative importance and basic requirements of application containers and services.

In some embodiments, the SLA may specify an availability requirement. Redundancy can enhance availability. For example, a request to provision one application container 110 with a high uptime can inform director 104 that the application container 110 should have redundant copies for backup. Accordingly, in some embodiments, director 104 can determine an amount of redundancy (e.g., how many "copies") and a type of redundancy (e.g., geographical, vendor, or physical diversity) that will provide the required amount of availability and uptime specified by the SLA. Vendor diversity can include using physical machines that come from various vendors or product lines in case a line or vendor has undiscovered vulnerabilities. Physical diversity can include provisioning the components of the redundant application containers 110 so that they do not share any physical component (e.g., bare-metal machine). In some embodiments, an SLA that specifies a higher uptime can inform director 104 to provision the associated application containers using physical components that are of a certain class or quality. For example, director 104 can provision application container 110 that requires a high amount of uptime on a higher quality server.

In some embodiments, the specifications of an SLA are in one format and require translation to an application container building block for automatic application in datacenter 100 by director 104. FIG. 3 shows an example translation table that maps an SLA provisioning time (range) to an application container provisioning priority. For example if an SLA specifies that its services should be provisioned with 15 minutes, this can translate to an application container provisioning priority of 1. In some embodiments, an SLA's provisioning priority is dynamically calculated.

In some embodiments, an SLA can specify an uptime requirement and an application container can be provisioned associated with that SLA. In some embodiments, director 104 can determine an operating priority level for the application container based on the uptime requirement. For example, an uptime requirement of five nines ("99.999%") can result in an operating priority level of 1. The operating priority level can be associated with the application container and can be used for managing application container resources within datacenter 100. For example, application containers 110 with a higher operating priority can have priority for computational, storage, bandwidth, etc. resources over application containers with a lower operating priority.

Figure 4A:
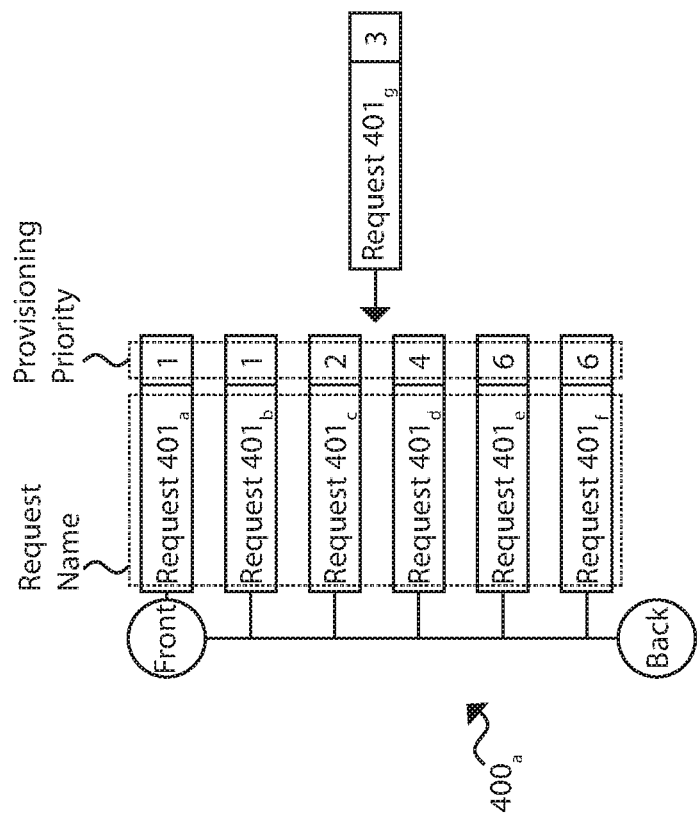
FIG. 4A and FIG. 4B show example provisioning queues according to various embodiments.
Figure 4B:
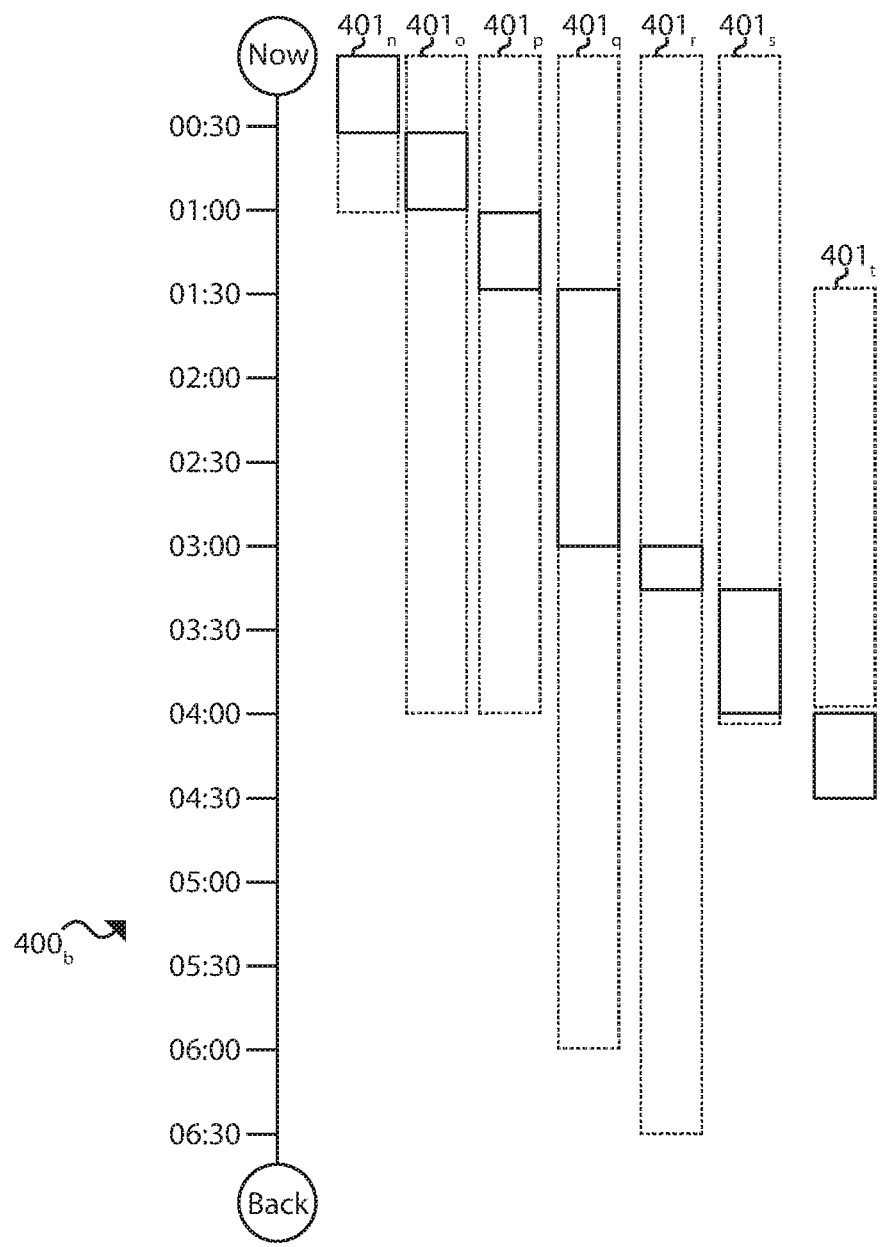

FIGS. 4A and 4B show example provisioning queues $400_a$ and $400_b$ (collectively, "provisioning queue 400") containing requests $401_a$-$401_t$ (collectively, "request 401"). In some embodiments, director 104 provisions application containers 110 using provisioning queue 400. In some such embodiments, director 104 can place a request to provision an application container 110 in provisioning queue 400 based on the associated application container provisioning priority. For example, in FIG. 4A, provisioning queue $400_a$ contains requests $401_a$-$401_g$ that each have a provisioning priority (e.g., request $401_a$ has a provisioning priority of 1 while request $401_e$ has a provisioning priority of 6). When director 104 receives a request 401, it can place the request 401 in the last position that is in front of the requests 401 with lower priority. For example, request $401_g$ with a provisioning priority of 3 can be placed in front of requests $401_d$-$401_f$ which have provisioning priorities of lower priority. "Lower priority" in this example embodiment can mean a provisioning priority that is a larger number, "1" being the highest priority. Provisioning priority queue $400_a$ can, in accordance to this principle, be an ordered list where the highest priority request 401 is always processed first and, if two requests 401 have the same priority (e.g., request $401_a$ and $401_b$), the request 401 that was first submitted can be serviced first.

In FIG. 4B, provisioning queue $400_b$ is organized based according to requests' $401_a$-$401_t$ expected provisioning duration and SLA-defined provisioning window according to various embodiments. For example, request $401_o$ has a provisioning window that extends to 04:00 and its expected provisioning duration is expected to last only from 00:30 to 01:00. In FIG. 4B, the time ("00:30," "01:00," . . . "06:30") can represent any unit of time (e.g., seconds, minutes, hours, days, etc.). For clarity of explanation, provisioning queue $400_b$, in this example embodiment, only processes one request 401 at a time; however it should be understood that provisioning queue 400 can process multiple requests 401 simultaneously according to available resources. In provisioning queue $400_b$, some requests 401 are expected to take relatively longer (e.g., request $401_q$) while others are expected to take relatively shorter (e.g., request $401_r$). Similarly, some requests 401 have a longer SLA-defined provisioning window (e.g., request $401_r$) and others have shorter provisioning windows (e.g., request $401_n$). In some embodiments, if request 401 completes its provisioning outside of its provisioning window then its SLA has been violated. In some embodiments, a request 401 can be scheduled to begin at a later time (e.g., after a delay); for example, request $401_t$ is scheduled to be provisioned at 01:30 and has until 04:00 to complete provisioning. A customer may request that 401 be scheduled for a later time based on dependency constraints (the requested application container 110 might require that another application container 110 be provisioned first), budgetary requirements, etc.

Director 104 can use provisioning queue $400_b$ to determine if a request 401 is at risk of violating its associated SLA. For example, in the current order, request $401_t$ is expected to finish at 04:30 even though its provisioning window ends at 04:00. Moving request $401_r$ between request $401_r$ and request $401_s$ would be inadequate as well because, even though it would permit request $401_t$ to complete in time, it would push request $401_s$ back and request $401_s$ would violate its SLA. Director 104 can move request $401_q$ to the back of the provisioning queue in order to satisfy every requests 401 associated SLA.

In some embodiments, a user interface dashboard comprising reports such as FIG. 4A and FIG. 4B can provide a network administrator with a representation of the network state. A network administrator can be informed, using the dashboard, about potential SLA violations and network bottlenecks. The dashboard can also be available to the customer.

Although provisioning queue 400 is discussed in regards to provisioning application containers 110. Provisioning queue 400 can be applied to managing other application container tasks by coordinating compute, storage, and network resources. For example, an SLA may specify that an application container 110 have a defined amount of bandwidth between two components; director 104 can limit the bandwidth of other resources so that the SLA is not violated.

Figure 5:
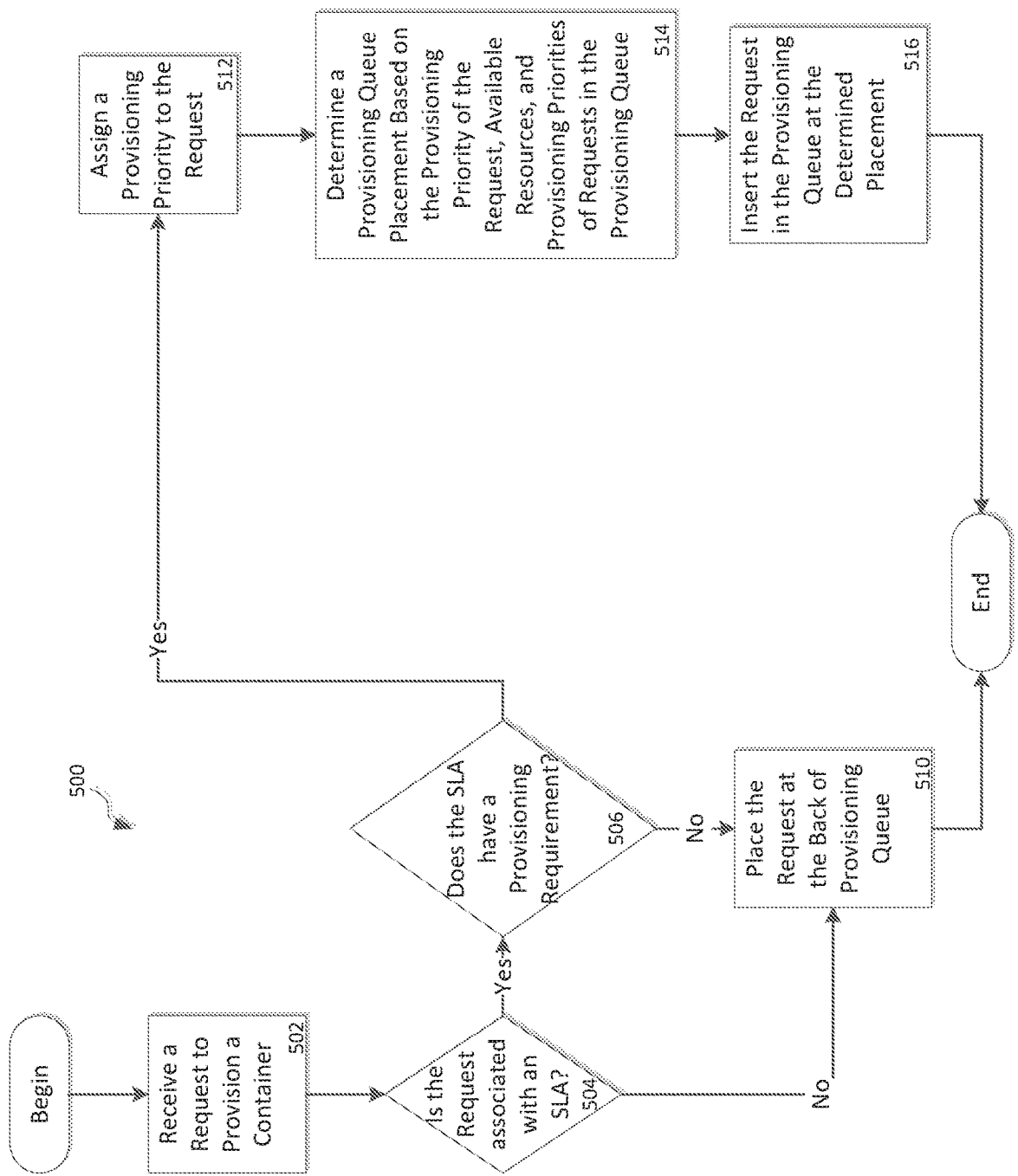
FIG. 5 shows example method according to various embodiments.

FIG. 5 shows example method 500 according to various embodiments. Method 500 can begin by receiving a request to provision an application container (step 502). The request to provision an application container can be initiated by a customer, an administrator, a process (e.g., director 104 can send a request in order to provide redundancy, to replace a failed application container 110, etc.). The method can continue by determining whether the request is associated with an SLA (step 504). For example, the request can contain a reference to an SLA specifically, the request can include an SLA requirement (e.g., the request can specify an allotment of time to service the request), the system performing method 500 can determine a group (e.g., a user group) associated with the request and detect an SLA associated with the group, the system performing method 500 can consult SLA manager 108 to determine an SLA associated with the request, etc. If the request is associated with an SLA, example method 500 can continue by determining if the SLA has a provisioning requirement (step 506). Similar to step 504, the step performing step 506 can consult various sources to make such a determination. A "provisioning requirement" can include an allotted time to provision (the request can be serviced within a certain number of seconds, minutes, hours, etc.), a "due date" (the request can be serviced by a certain time and date), a total provisioning time (e.g., once the provisioning begins, it must be completed within a certain amount of time), a provisioning priority level (e.g., a level 4 out of 5), a queue preference (e.g., in some embodiments, the system can maintain multiple provisioning queues and the SLA can specify one of the provisioning queues, such as a higher priority queue), etc.

The system performing example method 500 can analyze the current status of provisioning queue and determine that other requests, in combination of the ability of the system to service the other requests, might result in an SLA not being satisfied. For example, request $401_t$ in FIG. 4B is expected to be serviced outside of its SLA-defined provisioning window. The system can then rearrange the provisioning queue to ensure each request is satisfied. In some embodiments, the SLA can specify that the request be serviced prior to another request, for example, because the one is a prerequisite for the other. The system performing example method 500 can review the provisioning queue on a regular basis to determine the expected provisioning times of various requests in the queue.

If the request is not associated with an SLA, if the request does not have a provisioning requirement, example method 500 can continue and place the request at the back of the provisioning queue (step 510).

The system performing example method 500 can then determine a provisioning queue placement based on the provisioning priority of the request, available resources, and provisioning priorities of requests in the provisioning queue (step 514). In some embodiments, the provisioning queue has various placements (e.g., a first placement contains the request that will be processed first, requests in a second placement and onward can be processed according to their number). The provisioning queue placement can include the numbered placement in the queue. In some embodiments, the placement is a time in the queue (e.g., at 2:30 a.m.). In some embodiments, there are multiple provisioning queues including a high priority queue and a low priority queue, the placement can include in which queue the request should be placed. The available resources in mentioned in step 514 can include processing, networking, storage, etc. resources.

The method can then include inserting the request in the provisioning queue at the determined placement (step 516). In some embodiments, this insertion will displace one or more requests that were already in the queue. These displaced requests can either be shifted backwards in the queue (e.g., if the request is inserted in placement 3, a request that was in placement 3 can be shifted to placement 4, a request in placement 4 can be shifted to placement 5, etc.). In some embodiments, displaced requests can be placed into provisioning queue anew (e.g., ignoring their prior placement), using example method 500.

In some embodiments, an SLA associated with a provisioning request can have an uptime requirement. In some embodiments, the system can determine, based on the SLA, that redundant application containers 110 should be provisioned. The system can then provision a redundant application container 110 in two or more datacenters 100.

In some embodiments, that the principles disclosed herein can be applied to managing requests for various types of resources, not just the provisioning of application containers 110. For example, after provisioning an application container 110, the principles disclosed herein can be applied to the prioritization of processing requests. For example, queue 400 can be a processing queue for tasks requested by an application container 110. Example tasks can include video rendering, data transfer (e.g., from one datacenter 100 to another), compression, analytics, etc.

Figure 6:
FIG. 6 depicts an example table showing various SLA Service Categories, SLA Service Definitions, and Application Container Building Blocks according to various embodiments.

FIG. 6 depicts an example table 600 showing various SLA service categories, SLA service definitions, and application container building blocks.

An SLA service category can be an SLA classification for a customer to select. For example, the highest service category, "platinum," can be for business critical services. Examples of business critical services include back-end databases, safety and life support systems, and security systems (e.g., intrusion detection, virus protection, physical premises security, etc.). Another service category, "gold," can be for customer facing applications (apps). Examples of customer facing apps include web servers, application programming interfaces that are used by third party apps, etc. Another service category, "silver," can be for internal apps. Examples of internal apps include databases, human resource apps (e.g., payroll), internal messaging apps, helpdesk apps, etc. Another service category, "bronze," can be for lowest priority applications such as standard apps. Examples of standard apps include backup and version control apps, beta apps, legacy apps and services, etc.

SLA service definitions can be standardized across multiple platforms and can utilize common metrics. SLA service definitions can include standard metrics (e.g., those that are generally applicable to multiple applications) as well as customized metrics tailored to specific applications. An example metric is provision time. Provision time can mean the time it takes for a request for a service (e.g., an application container 110) to be operational after being requested. For example, it can vary from less than 2 hours (for platinum SLAs), to less than five days (for bronze SLAs).

Another SLA metric can be availability. Availability is usually expressed as a percentage of uptime in a given period (e.g., year, month, or week). Availability can be expressed as a percentage (e.g., 99.99% or "four nines", 99% or "two nines", etc.) Service level agreements often refer to monthly downtime or availability in order to calculate service credits to match monthly billing cycles. Another SLA metric can be uptime. Uptime and availability are not necessarily synonymous. A system can be up, but not available, as in the case of a network outage.

Other SLA metrics include Router Throughput (e.g., throughput on switch 106, or datacenter edge node 102), Quality of Service options, network monitoring, etc.

Application container building blocks can be specific parameters used by director 104 to orchestrate and provision application containers 110. In some embodiments, the SLA service category or SLA service definition metrics can translate to or inform certain application container building blocks. For example, director 104 (or a wizard used to create application containers 110) might not have an option for "provision time" for an application container 110 (or container template); rather, director 104 can use the provision time to inform an "application container provisioning priority assignment" level. One provisioning time (e.g., "<2 hours" for Platinum service category) can translate to a certain provisioning priority assignment (e.g., "1" for Platinum service category). As described above, provisioning queue management and placement can accommodate provisioning priority assignments.

Another application container building block can be a high availability deployment model. The SLA metric of availability can translate to whether the high availability deployment model it utilized. For example, if availability of 99% or greater is in an SLA Service Definition, the high availability deployment model can be utilized. Application containers 110 (or container templates) that use the high availability deployment model can be provisioned across multiple physical locations. Provisioning an application container 110 in multiple locations can provide redundancy so that if one location becomes unavailable, the other location(s) can take over. In some embodiments, provisioning an application container template using the high availability deployment model results in a primary application container and a secondary (or backup container) that only services requests if the primary application container becomes unavailable. Alternatively, provisioning an application container template with high availability results in multiple application containers 110 in various regions such that clients can connect to a geographically close application container 110. In some embodiments, application containers 110 that are provisioned using high availability can be synchronized so that changes made to one instantiation are reflected in other instantiations; alternatively, such application containers 100 can be modified independently.

Another application container building block can be component specific quality of service (QoS). For example, if the SLA service definition specifies quality of service in general, then a certain application container building block can be configured to provide QoS (e.g., a switch, router, etc.).

Figure 7A:
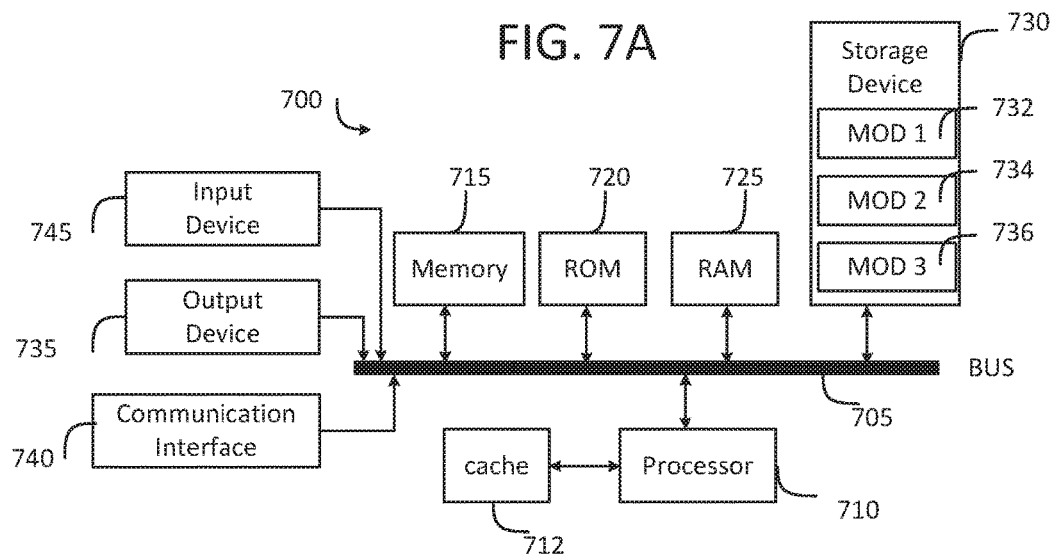
FIGS. 7A and 7B illustrate example system embodiments.
Figure 7B:
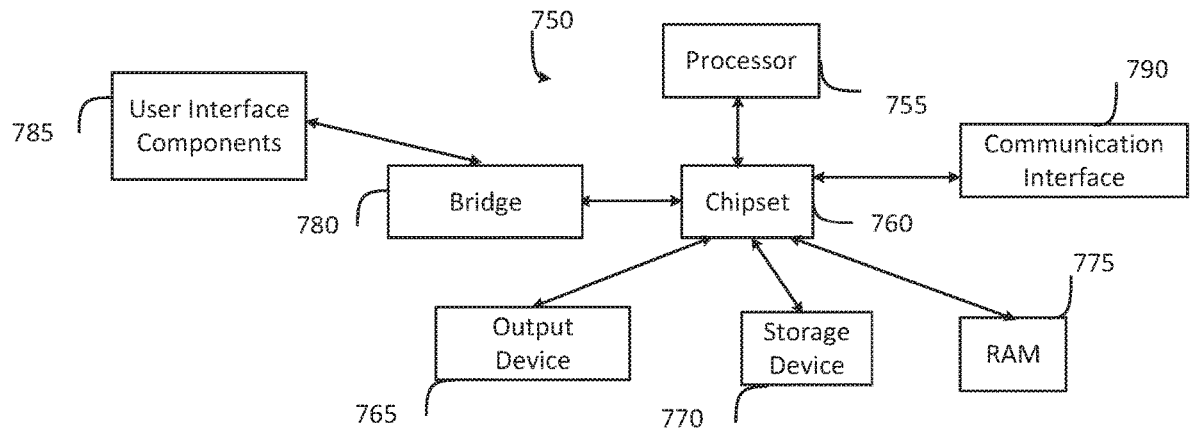

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 770 and random access memory (RAM) 775, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 737, module 7 734, and module 3 736 stored in storage device 730, configured to control the processor 910 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 775, read only memory (ROM) 770, and hybrids thereof.

The storage device 730 can include software modules 737, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A computer-implemented method comprising:
providing a template for orchestration of a service in a datacenter;

determining a priority level for the service based on a time to provision;

when the service is associated with a provisioning requirement:

determining a provisioning queue placement for the service based on available computing resources to provision the service, the determined priority level of the service, and a priority level associated with tasks in an existing queue, and provisioning the service based on the template, the provisioning including insertion of a request in a queue based on the provisioning queue placement; and when the service is not associated with the provisioning requirement;

placing the request in a back of the queue.

2. The method of claim 1,
wherein,
the template includes selectable virtual processing services, virtual networking services, storage services, and service level requirements for the service, and
the datacenter includes a plurality of segmented sections of the datacenter.

3. The method of claim 1, wherein access to the service from other services in the datacenter is provided by a virtual firewall.

4. The method of claim 1, wherein the template is associated with a user group and service requirements are associated with the user group.

5. The method of claim 1, wherein if the insertion of the request causes displacement of another request, then the another request is shifted backwards in the queue to a next placement following the request.

6. The method of claim 4, wherein the service requirements include an uptime requirement, the method comprising:
determining an operating priority level for the service based on the uptime requirement.

7. A non-transitory computer-readable medium having computer-readable instructions stored thereon that, when executed by a processor of a computer, cause the computer to:
provide a template for orchestration of a service in a datacenter;
determining a priority level for the service based on a time to provision;
when the service is associated with a provisioning requirement:
determine a provisioning queue placement for the service based on available computing resources to provision the service, the determined priority level of the service, and a priority level associated with tasks in an existing queue, and
provision the service based on the template, the provision of the service including insertion of a request in a queue based on the provisioning queue placement; and
when the service is not associated with the provisioning requirement;
place the request in a back of the queue.

8. The non-transitory computer-readable medium of claim 7, wherein access to the service from other services in the datacenter is provided by a virtual firewall.

9. The non-transitory computer-readable medium of claim 7, wherein the template is associated with a user group and service requirements are associated with the user group.

10. The non-transitory computer-readable medium of claim 7,
wherein,
the datacenter includes a plurality of segmented sections, and
the template includes selectable: virtual processing services, virtual networking services, storage services, and service level requirements for the service.

11. The non-transitory computer-readable medium of claim 7, wherein if the insertion of the request causes displacement of another request, then the another request is shifted backwards in the queue to a next placement following the request.

12. The non-transitory computer-readable medium of claim 9, wherein the service requirements include an uptime requirement, wherein the instructions further cause the computer to:
determine an operating priority level for the service based on the uptime requirement.

13. A system comprising:
a processor;
a computer-readable medium; and
non-transitory computer-readable instructions stored on the computer-readable medium that, when executed by the processor, cause the system to:
provide a template for orchestration of a service in a datacenter;
determining a priority level for the service based on a time to provision;
when the service is associated with a provisioning requirement:
determine a provisioning queue placement for the service based on available computing resources to provision the service, the determined priority level of the service, and a priority level associated with tasks in an existing queue; and
provision the service based on the template, the provision of the service including insertion of a request in a queue based on the provisioning queue placement, and when the service is not associated with the provisioning requirement;
placing the request in a back of the queue.

14. The system of claim 13, wherein access to the service from other services in the datacenter is provided by a virtual firewall.

15. The system of claim 13, wherein the template is associated with a user group and service requirements are associated with the user group.

16. The system of claim 13,
wherein,
the datacenter includes a plurality of segmented sections, and
the template includes selectable: virtual processing services, virtual networking services, storage services, and service level requirements for the service.

17. The system of claim 13, wherein if the insertion of the request causes displacement of another request, then the another request is shifted backwards in the queue to a next placement following the request.

* * * * *